United States Patent
Anderson et al.

(10) Patent No.: US 10,032,246 B2
(45) Date of Patent: Jul. 24, 2018

(54) APPROACH TO CACHING DECODED TEXTURE DATA WITH VARIABLE DIMENSIONS

(71) Applicant: NVIDIA CORPORATION, Santa Clara, CA (US)

(72) Inventors: Eric T. Anderson, Palo Alto, CA (US); Poornachandra Rao, Cedar Park, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 262 days.

(21) Appl. No.: 14/049,557

(22) Filed: Oct. 9, 2013

(65) Prior Publication Data

US 2015/0097851 A1    Apr. 9, 2015

(51) Int. Cl.
G06T 11/40    (2006.01)
G06T 1/60    (2006.01)

(52) U.S. Cl.
CPC .................................... G06T 1/60 (2013.01)

(58) Field of Classification Search
CPC .................................. G06T 1/60; G06T 15/04
USPC ........................... 711/123, 129, 152; 345/552
See application file for complete search history.

(56) References Cited

U.S. PATENT DOCUMENTS

| | | | | |
|---|---|---|---|---|
| 6,744,438 B1 * | 6/2004 | Baldwin | ................. | G06T 11/40 345/531 |
| 2005/0225557 A1 * | 10/2005 | Koneru | ................. | G06T 11/001 345/552 |
| 2007/0052713 A1 * | 3/2007 | Chung | ................. | G06T 15/04 345/501 |
| 2008/0094407 A1 * | 4/2008 | Xu | ................. | G06T 15/04 345/552 |
| 2009/0222627 A1 * | 9/2009 | Reid | ................. | G06F 12/0804 711/135 |
| 2010/0191918 A1 * | 7/2010 | Lee | ................. | G06F 12/0862 711/137 |
| 2014/0237321 A1 * | 8/2014 | Gold | ................. | G06F 11/1068 714/773 |

OTHER PUBLICATIONS

Michael Doggett, "Texture Caches", Micro 32(3), May-Jun. 2012.*

* cited by examiner

*Primary Examiner* — Weiming He
(74) *Attorney, Agent, or Firm* — Artegis Law Group, LLP (57) ABSTRACT

A texture processing pipeline is configured to store decoded texture data within a cache unit in order to expedite the processing of texture requests. When a texture request is processed, the texture processing pipeline queries the cache unit to determine whether the requested data is resident in the cache. If the data is not resident in the cache unit, a cache miss occurs. The texture processing pipeline then reads encoded texture data from global memory, decodes that data, and writes different portions of the decoded memory into the cache unit at specific locations according to a caching map. If the data is, in fact, resident in the cache unit, a cache hit occurs, and the texture processing pipeline then reads decoded portions of the requested texture data from the cache unit and combines those portions according to the caching map.

22 Claims, 9 Drawing Sheets

APPROACH TO CACHING DECODED TEXTURE DATA WITH VARIABLE DIMENSIONS

BACKGROUND OF THE INVENTION

Field of the Invention

Embodiments of the present invention relate generally to texture processing and, more specifically, to an approach to caching decoded texture data with variable dimensions.

Description of the Related Art

A conventional texture cache stores encoded texture data for use by a texture processing pipeline. The texture data could be encoded according to adaptive scalable texture compression (ASTC), among other encoding standards. When a particular texture is needed for a rendering operation, the texture pipeline queries the cache to determine whether an encoded version of the texture data is resident in the cache. If the encoded version not currently cached, then external memory can be accessed and the encoded texture retrieved. The encoded texture is then cached and decoded for use by the texture processing pipeline. If the encoded version is, in fact, cached, then the encoded version can be decoded and provided to the texture processing pipeline. With this approach, multiple decoder units are typically coupled to the texture cache so that encoded texture data can be decoded in parallel.

However, the approach described above is problematic for several reasons. First, the multiple decoder units consume significant area in order to realize a certain level of throughput. The only way to increase that throughput is to introduce additional decoder units, which consumes additional area. Second, the existing decoder units oftentimes perform redundant decoding operations when a given portion of texture data is needed several different times. Thus, the increase in throughput realized by the parallel architecture of the decoder units may be diminished by the low efficiency with which these units sometimes operate.

As the foregoing illustrates, what is needed in the art is a more efficient technique for storing and accessing texture data.

SUMMARY OF THE INVENTION

One embodiment of the present invention sets forth a computer-implemented method for caching data being processed in a texture processing pipeline, including receiving a memory access request indicating that a data block should be returned from memory, determining that the data block does not reside in a cache unit associated with the texture processing pipeline, retrieving an encoded version of the data block from a global memory, decoding the encoded version of the data block to produce the data block, retrieving a caching map corresponding to a set of dimensions associated with the data block, and storing a first portion of the data block at a particular location within the cache unit according to the caching map.

One advantage of the disclosed technique is that the texture processing pipeline may efficiently pack texture data into the cache unit according to the caching map in such a way that bank conflicts and/or set conflicts may be reduced or avoided, thereby increasing the throughput of the cache unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
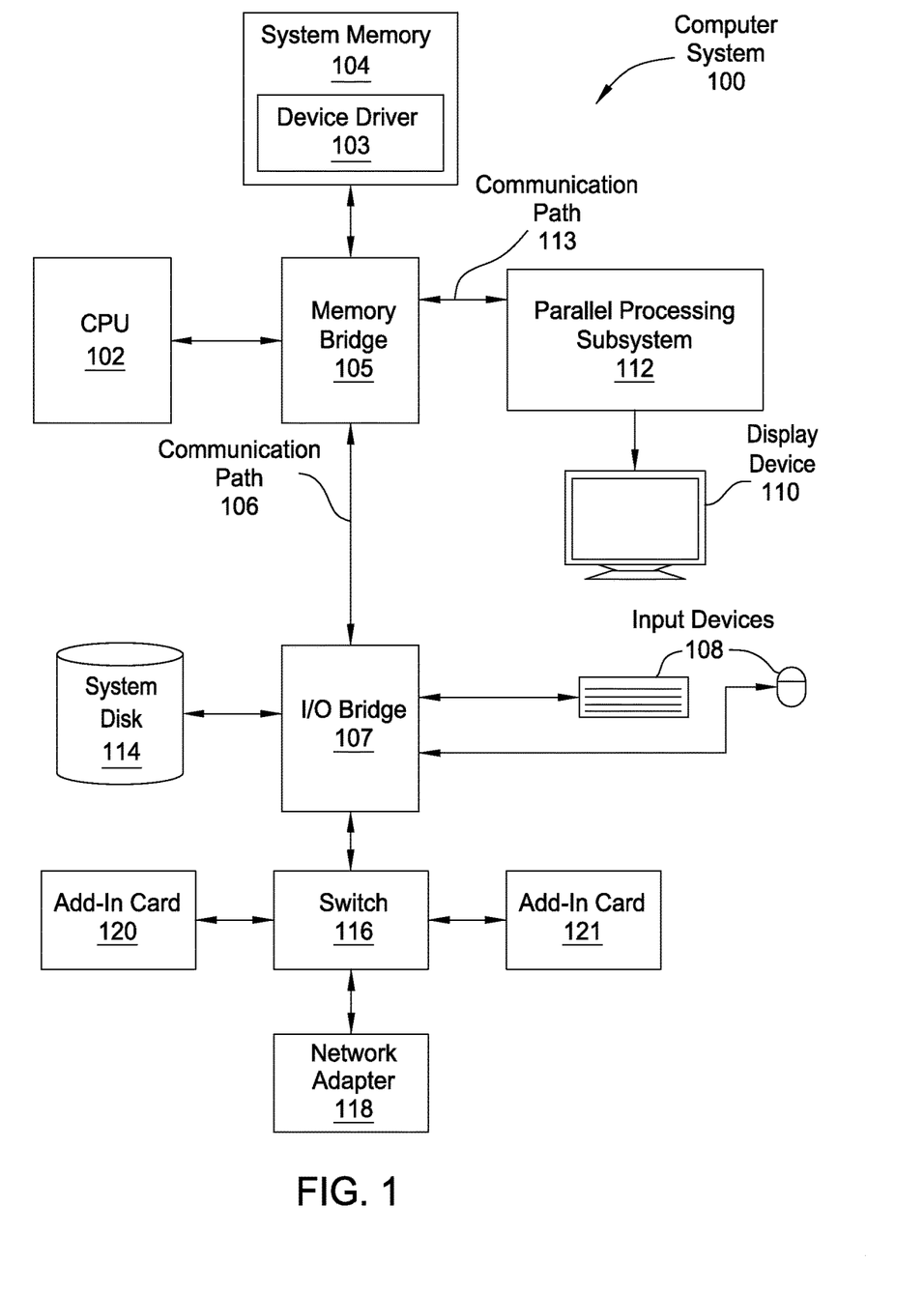
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
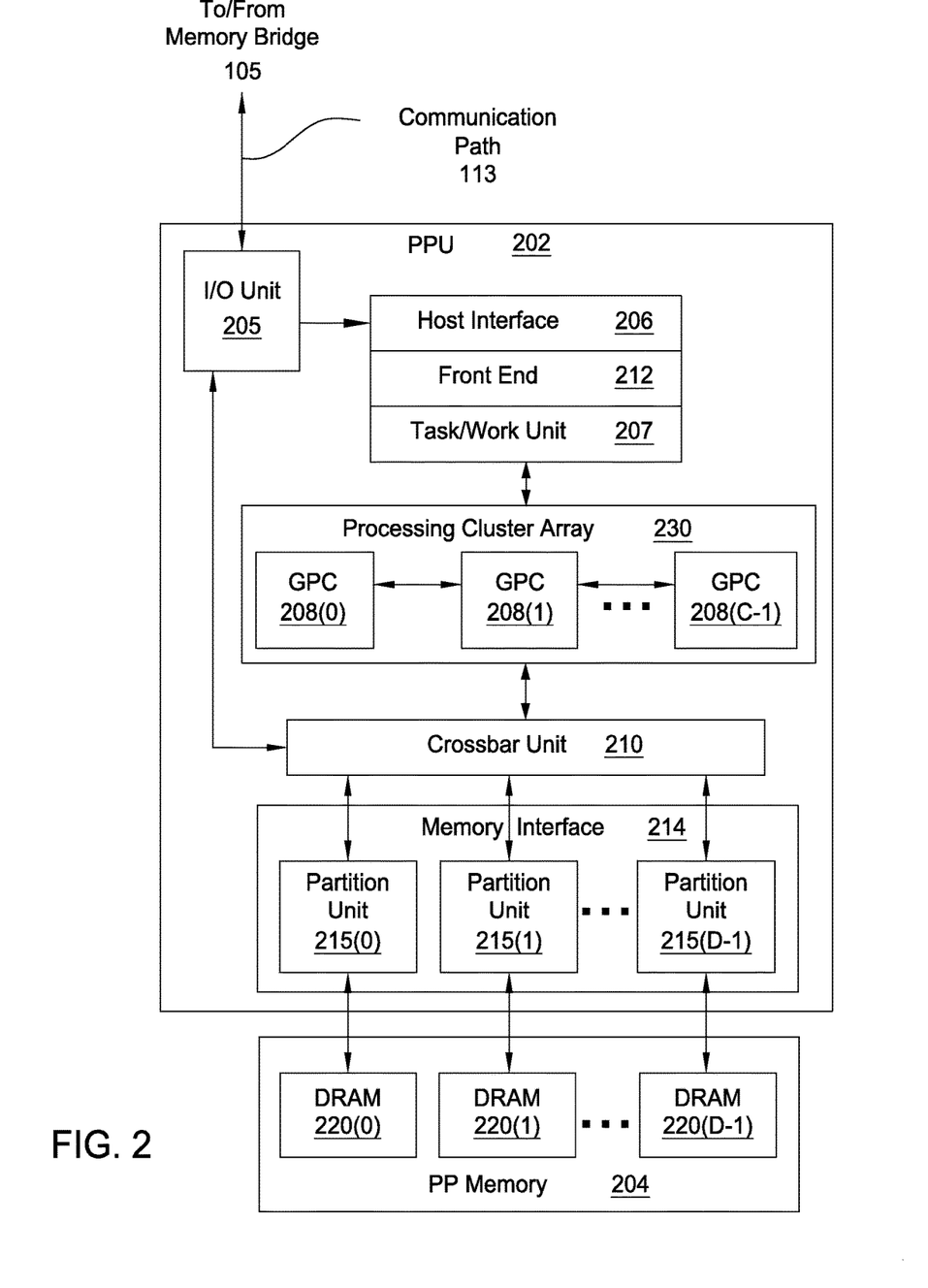
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
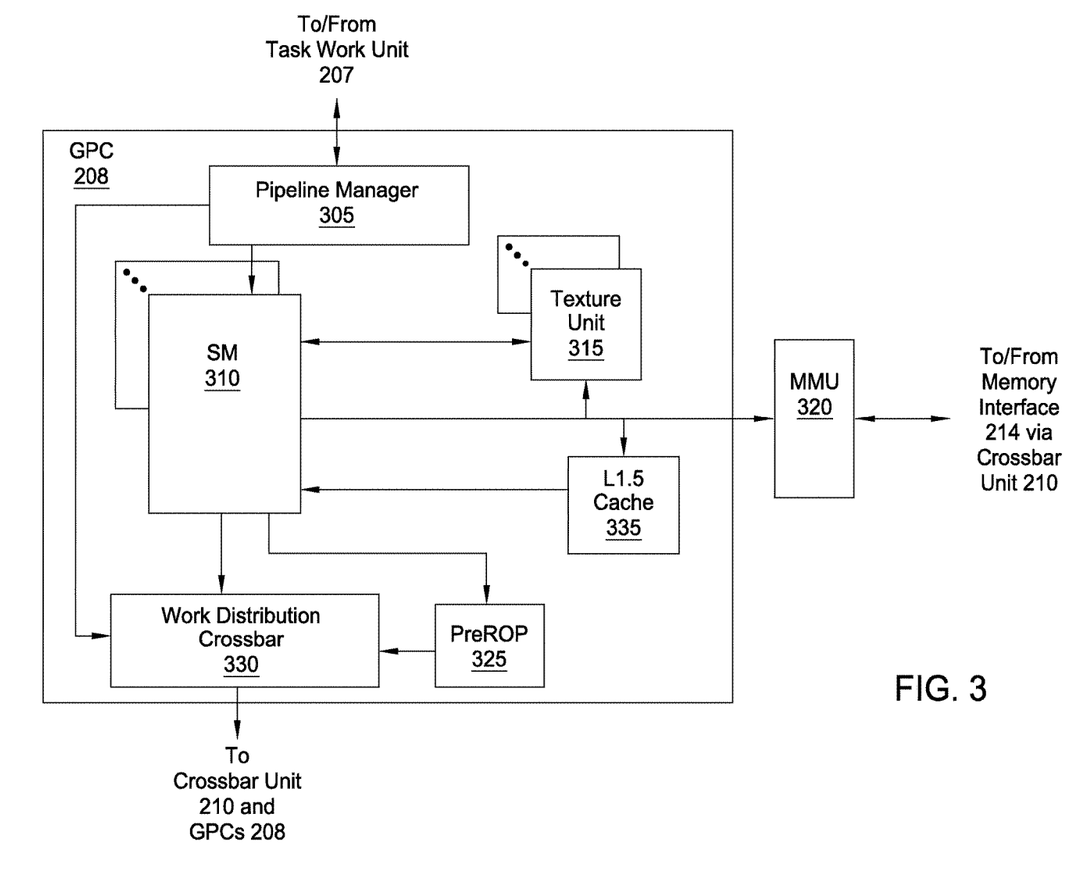
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Caching Texture Data Having Variable Size and Dimension

Texture unit 315 shown in FIG. 3 may be configured to implement a texture processing pipeline that is configured to access encoded texture data from global memory, decode that texture data, and then store the decoded texture data within a cache unit. The decoded texture data may have a wide variety of different physical dimensions, such as 5×5 or 10×10 texels. Consequently, the decoded texture data may not conveniently fit into the cache unit without some degree of organization. For example, if a given block of decoded texture data had non-power of two dimensions, then that texture data may not fit exactly into the cache unit without wasting some amount of cache space. In addition, simply writing the decoded texture data to the cache unit may cause inefficiencies when that data is retrieved at a later time due to potential bank conflicts and/or set conflicts.

To mitigate these potential issues, the texture processing pipeline mentioned above is configured to implement a collection of "caching maps" that dictate particular positions within the cache unit where different portions of decoded texture data should be stored. When storing decoded texture data according to these caching maps, the texture processing pipeline may efficiently pack texture data into the cache unit, without wasting significant space. Additionally, the texture processing pipeline may store texture data within the cache unit in such a way that bank conflicts and/or set conflicts may be reduced or avoided. The texture processing pipeline and caching maps described herein are described in greater detail below in conjunction with FIG. 4.

Figure 4:
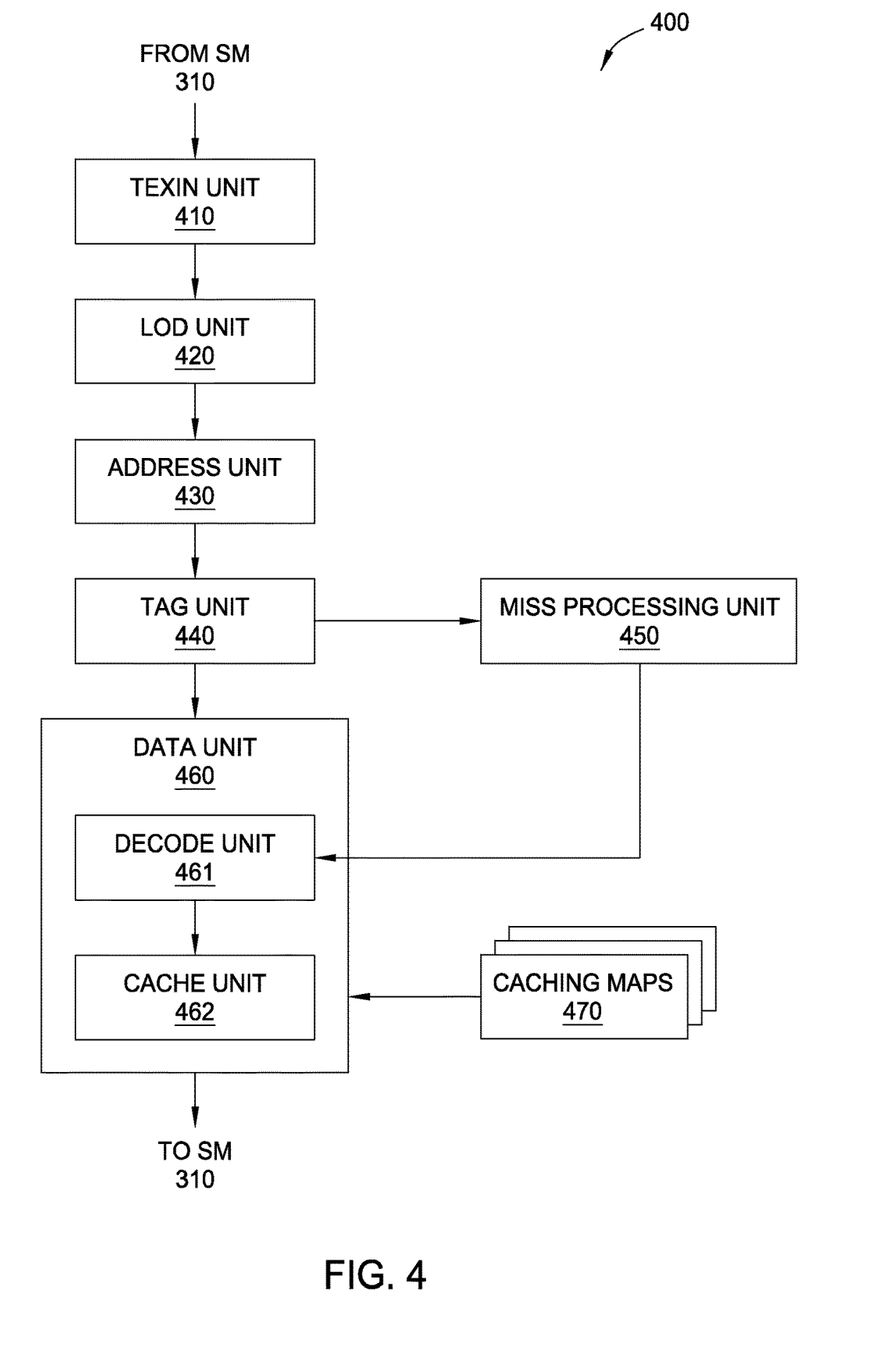
FIG. 4 is a block diagram of a texture processing pipeline that may be implemented by the texture unit of FIG. 3, according to one embodiment of the present invention.

FIG. 4 is a block diagram of a texture processing pipeline 400 that may be implemented by texture unit 315 of FIG. 3, according to one embodiment of the present invention. As shown, texture processing pipeline 400 includes a texture input (TEXIN) unit 410, a level of detail (LOD) unit 420, an address unit 430, a tag unit 440, a miss processing unit 450, and a data unit 460 coupled together in pipelined fashion. Data unit 460 includes a decode unit 461 and a cache unit 462. Data unit 460 is configured to access caching maps 470.

TEXIN unit 410 is configured to receive texture requests from SM 310 and to configure texture processing pipeline 400 to process those requests. TEXIN unit 410 may also perform various operations to gather additional data associated with texture requests. For example, TEXIN unit 410 could access a state cache (not shown) and gather state data associated with a given texture request, including texel size, texture starting point, texture dimensions, and texture border data, among other types of information related to the requested texture data. TEXIN unit 410 may incorporate this additional texture information into the texture request and then provide that request to LOD unit 420.

LOD unit 420 is configured to compute a "level of detail" for the requested texture data based on the position and orientation of a set of coordinates included within the texture request. The set of coordinates may represent the position and orientation of a texture residing within a graphics scene. LOD unit 420 may incorporate the computed level of detail into the texture request and then provide that request to address unit 430. Address unit 430 is configured to perform various address computations based on the coordinates within the texture request. The results of the address computations may be used to identify an entry in a tag table included within tag unit 440. Those address computations may also indicate various characteristics associated with the requested texture data, including an encoding format, size, dimension, position, and so forth. Address unit 430 provides the texture request and address computation results to tag unit 440.

Tag unit 440 includes a tag table that stores a set of entries. Each entry indicates that a particular portion of texture data resides within cache unit 462. Upon receiving the texture request and address computation results from address unit 430, tag unit 440 determines whether the tag table includes an entry corresponding to the requested texture data. When the tag table does not include such an entry, a cache miss occurs, and tag unit 440 determines that the requested texture data does not reside in cache unit 462. In response, tag unit 440 causes miss processing unit 450 to access the requested texture data from global memory.

Global memory stores texture data in an encoded format. In practice, that format is an adaptive scalable texture compression (ASTC) format, although persons skilled in the art will understand that the techniques disclosed herein may be applicable to other encoding formats as well. In order to process the cache miss, miss processing unit 450 is configured to compute a virtual address for the encoded texture data and then perform a virtual to physical address translation. Miss processing unit 450 then reads the encoded texture data from global memory and delivers that encoded data, along with the texture request and address computation results, to decode unit 461.

Based on the address computation results, decode unit 461 is configured to determine the encoding format associated with the encoded texture data, as well as the dimensions of the requested data (width×height in texels). Decode unit 461 then decodes the encoded texture data based on the determined format to generate the requested texture data. Data unit 460 then provides the decoded texture data to SM 310 of FIG. 3 to fulfill the texture request. Data unit 460 also stores the decoded texture data within cache unit 462 based on caching maps 470, as described in greater detail below.

Cache unit 462 may represent a cache memory residing within texture unit 315, L1 cache 320 residing within SM 310 shown in FIG. 3, or another cache memory unit residing elsewhere. Cache unit 462 is organized into multiple different sets, where each set includes a number of different cache lines. Each cache line includes multiple different sectors, where each sector includes multiple different banks. A given bank may store decoded texture data. In one embodiment, a bank may be a 64-bit wide 1-read 1-write random access memory (RAM), and a 128B cache line may include 16 such banks. In practice, each set includes 4 cache lines, each cache line includes 4 sectors, and each sector includes 4 banks, although other organizational schemes are also possible.

As a general matter, different banks in the same sector may be accessed in a single clock cycle of cache unit 462. However, a bank conflict may occur during a given clock cycle when a sampling footprint of texture fetches attempts to access two different locations associated with the same bank during that clock cycle. Additionally, any combination of banks in different sectors may be accessed in a single clock cycle of cache unit 462, and cache lines in different sets may be accessed in a single clock cycle of cache unit 462. However, a set conflict may occur when a sampling footprint of texture fetches attempts to access two different cache lines within the same set.

Based on caching maps 470, data unit 460 is configured to store different portions of the decoded texture data within particular banks, sectors, and sets of cache lines associated with cache unit 462. Caching maps 470 includes one or more different maps for each different possible dimension of decoded texture data. The decoded texture data may have a wide variety of different texel dimensions, including, for example, 4×4, 5×5, 6×5, 8×5 8×6, 8×8, 10×5, 10×8, 10×10, 12×10, and 12×12, among other possibilities.

Figure 6A:
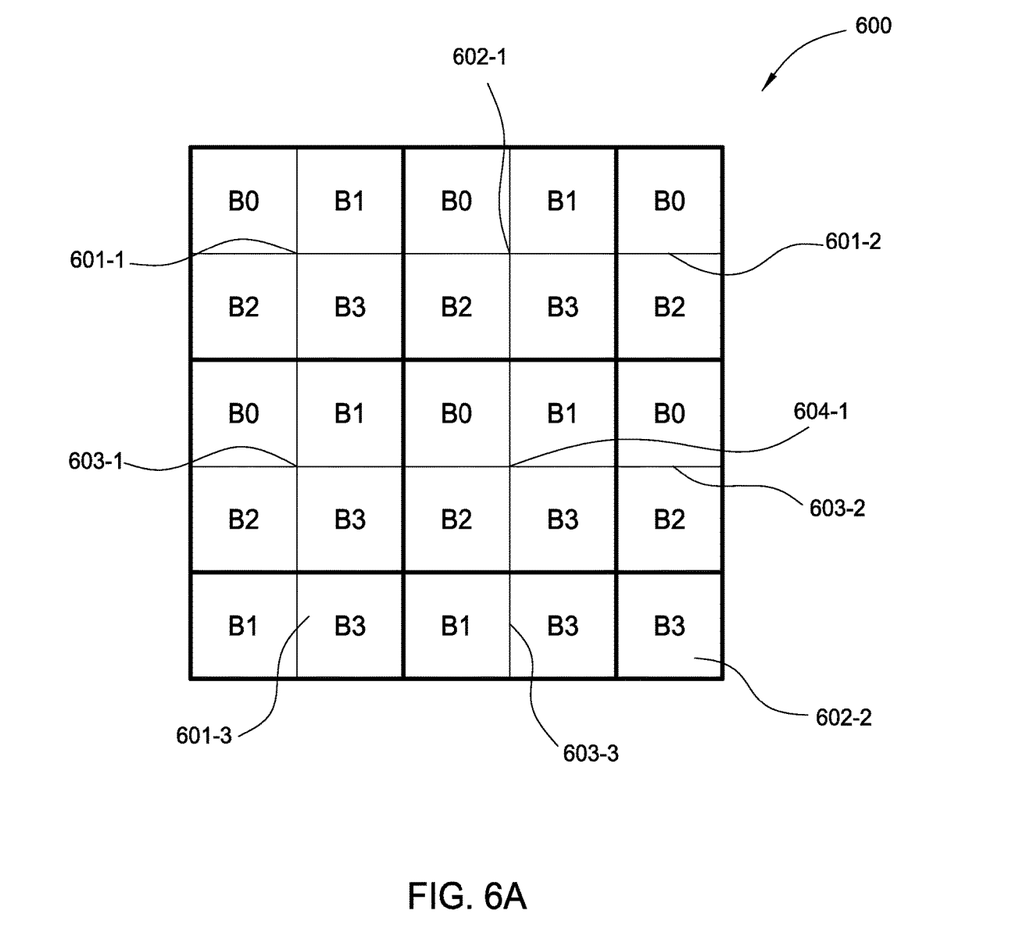
FIGS. 6A-6B illustrate exemplary caching maps that indicate various banks and sectors within a cache unit where different portions of decoded texture data may be stored to avoid bank conflicts, according to one embodiment of the present invention.
Figure 6B:
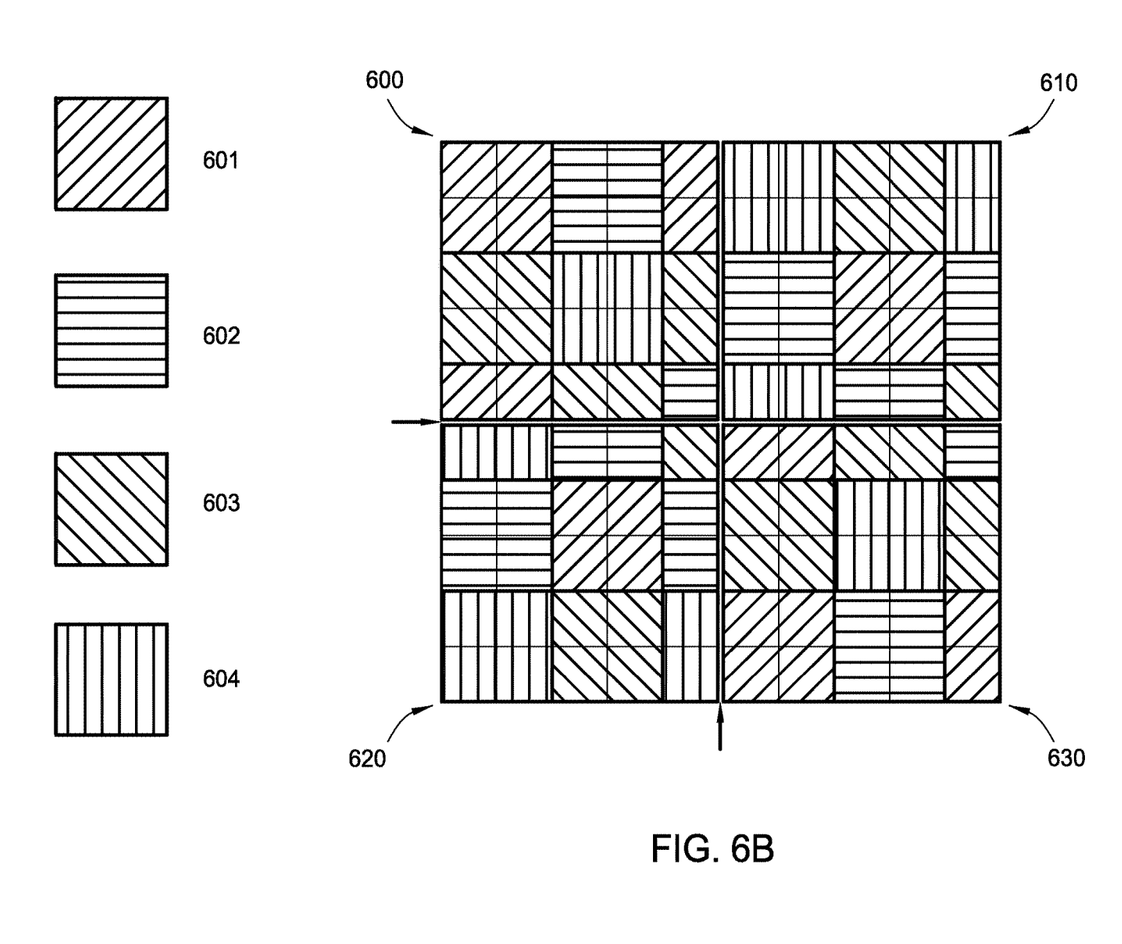
Figure 7A:
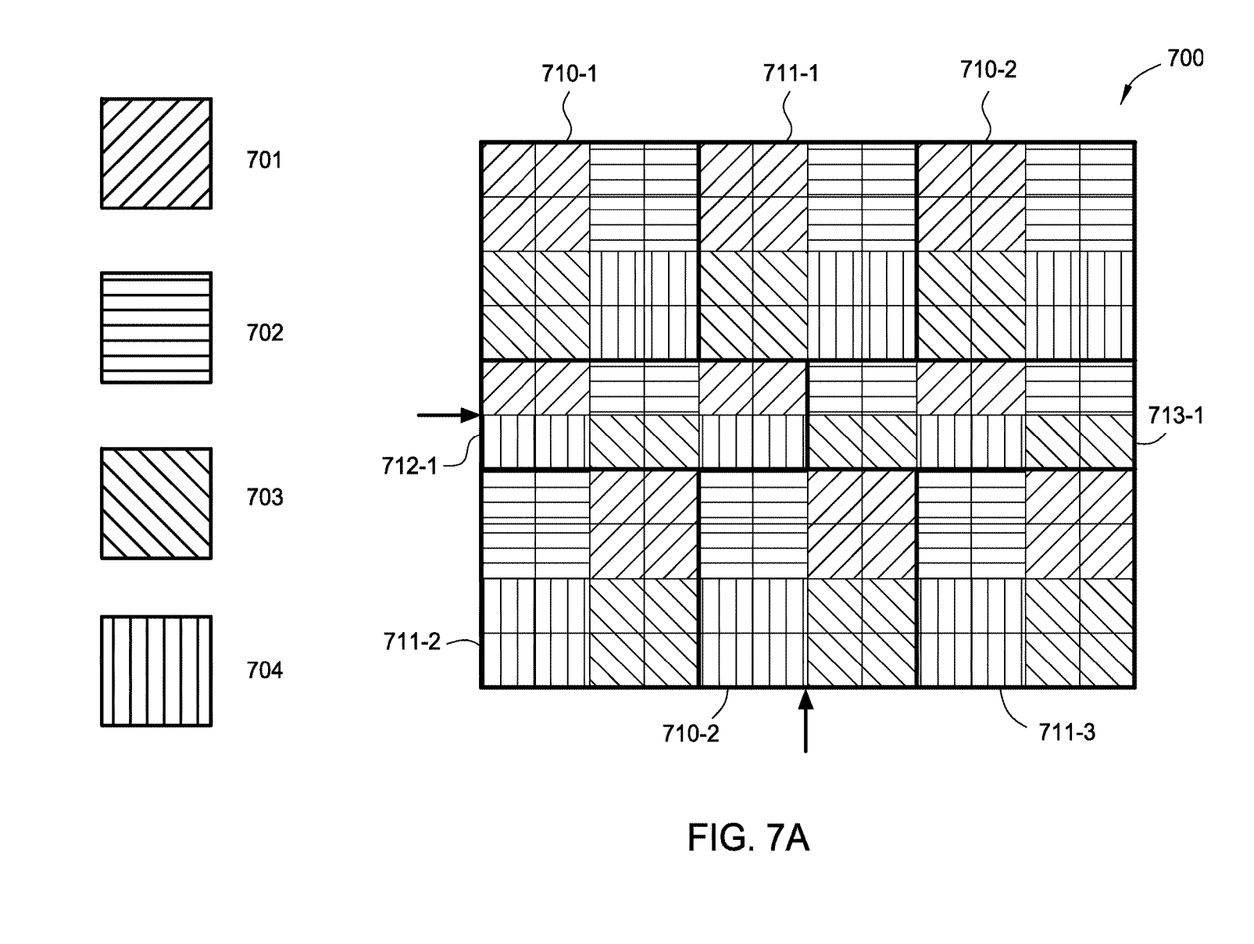
FIGS. 7A-7B illustrate exemplary caching maps that indicate various sectors and sets within a cache unit where different portions of decoded texture data may be stored to avoid set conflicts, according to one embodiment of the present invention.
Figure 7B:
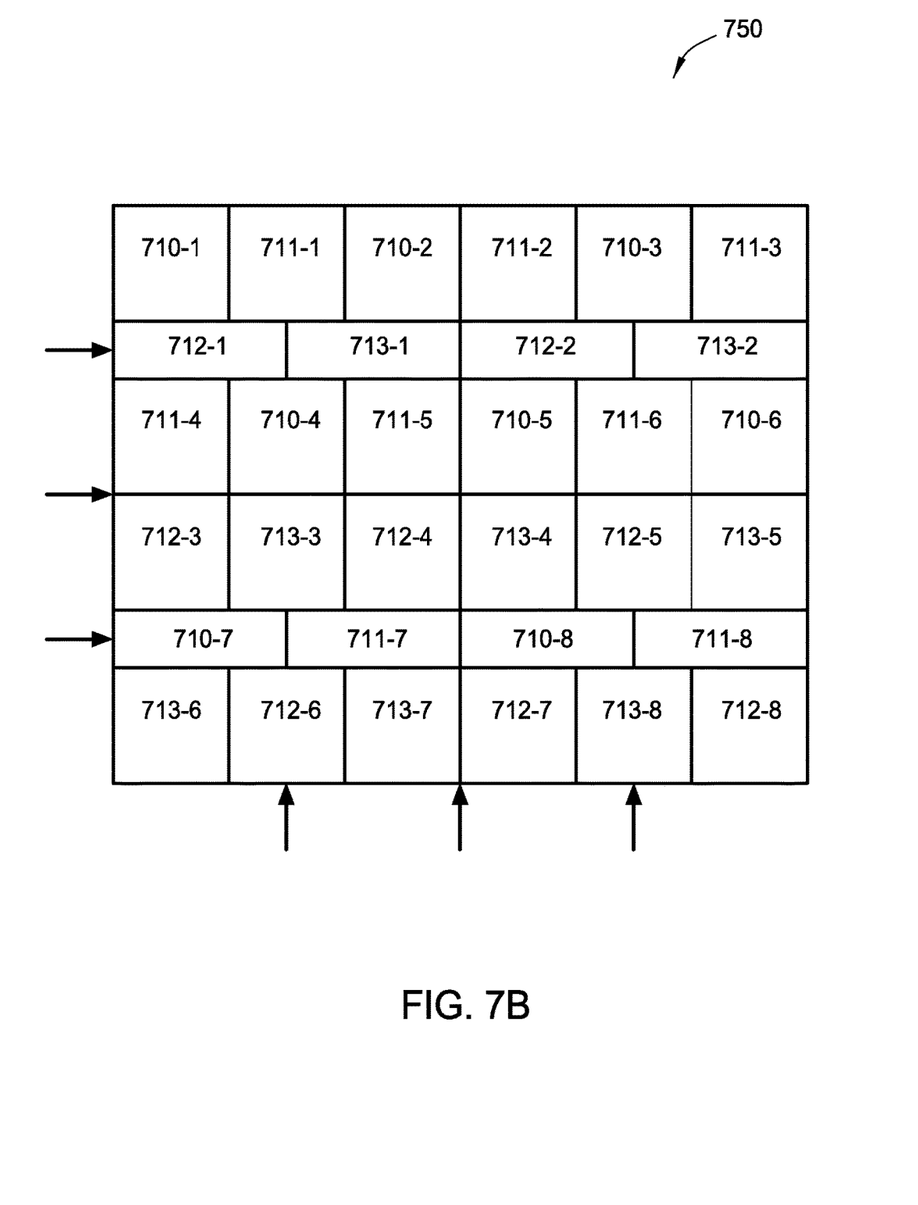

For each such dimension, caching maps 470 includes at least one caching map that specifies a particular bank, sector, and set of cache unit 462 where each different texel of decoded texture data should be stored. Data unit 460 may efficiently pack texture data into a minimal number of cache lines of cache unit 462 based on caching maps 470. Data unit 460 may also organize that texture data to reduce the occurrence of bank conflicts and/or set conflicts when the cached texture data is accessed at a later time. FIGS. 6A-6B provide examples of caching maps that may reduce the occurrence of bank conflicts, while FIGS. 7A-7B provide examples of caching maps that may reduce the occurrence of set conflicts.

Once the decoded texture data is stored within cache unit 462, data unit 460 may notify tag unit 440, which, in turn, creates an entry that indicates the presence of that decoded texture data within cache unit 462. When processing a texture request for that decoded data, tag unit 440 may access that entry and determine that the decoded data does, in fact, reside within cache unit 462, resulting in a cache hit. Tag unit 440 notifies data unit 460 of the cache hit and the location within cache unit 462 where the requested data may be found. That location could be, e.g., an offset where the texture data begins, etc. Tag unit 440 also provides the texture request, along with the address computation data, to data unit 460.

Data unit 460 is configured to process the cache hit by analyzing the address computation data and extracting the dimensions of the requested data. Data unit 460 then retrieves a caching map 470 corresponding to those dimensions of texture data. Based on the location of the texture data within cache unit 462, and based on the particular organization of the texels of that texture data within the banks, sectors, and sets of cache unit 462, data unit 460 reads each texel of the texture data from cache unit 462. Data unit 460 may then reassemble the decoded texture data based on the caching map, and the decoded texture data may then be provided to SM 310 to fulfill the texture request.

By implementing the unique architecture described herein, texture processing pipeline 400 need not include multiple different decode units coupled downstream of cache unit 462. Since decoded texture data may be efficiently stored within cache unit 462 (i.e., based on caching maps 470), that decoded texture data may be decoded just once prior to insertion into cache unit 462, instead of multiple times for each different cache hit. The techniques described thus far for fulfilling a texture request are also described below, in stepwise fashion, in conjunction with FIG. 5.

Figure 5:
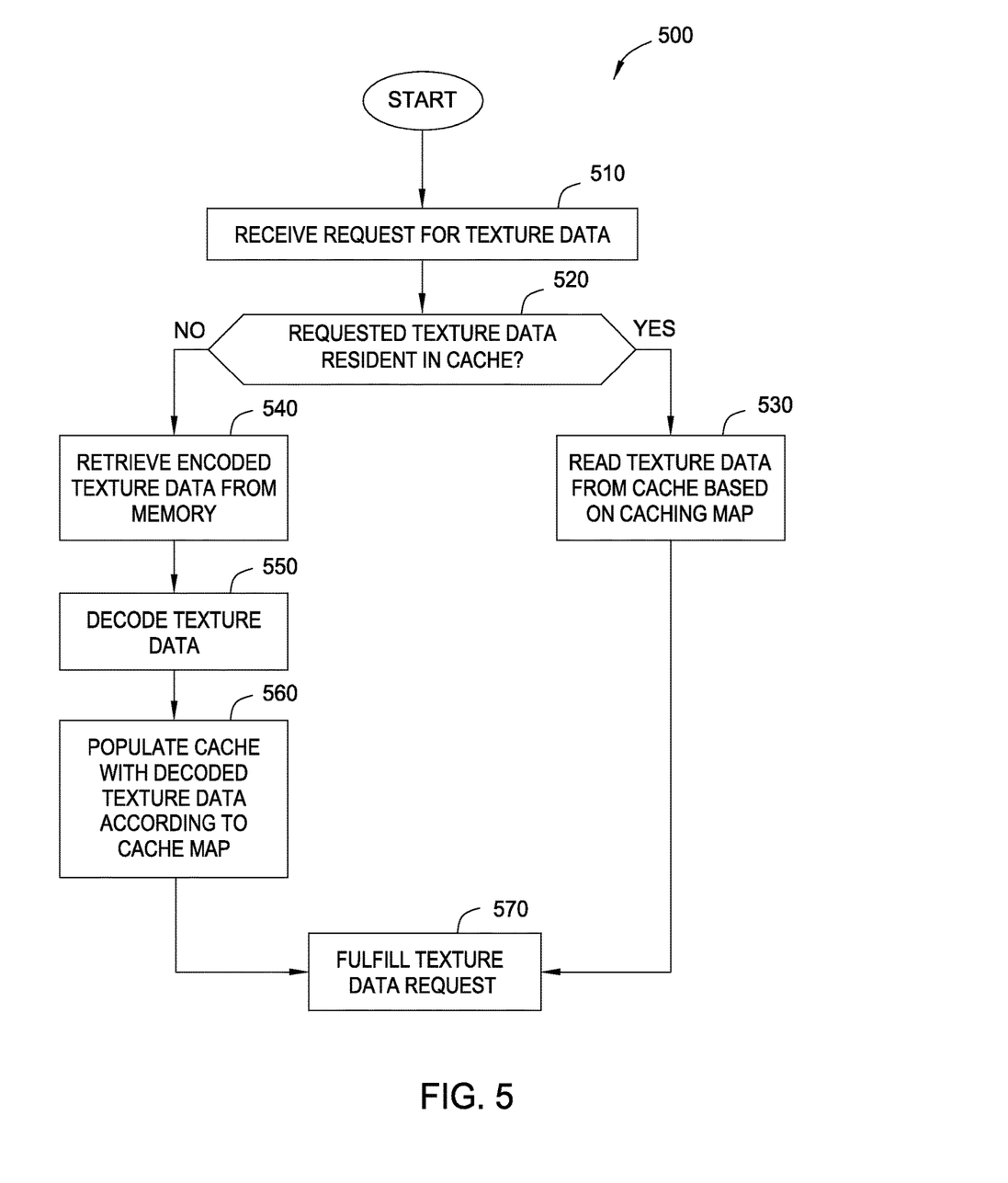
FIG. 5 is a flow diagram of method steps for encoding and decoding texture data based on a caching map, according to one embodiment of the present invention.

FIG. 5 is a flow diagram of method steps for encoding and decoding texture data based on a caching map, according to one embodiment of the present invention. Although the method steps are described in conjunction with the systems of FIGS. 1-4, persons skilled in the art will understand that any system configured to perform the method steps, in any order, is within the scope of the present invention.

As shown, a method 500 begins at step 510, where texture processing pipeline 400 of FIG. 4 receives a request for texture data form SM 310 of FIG. 3. TEXIN unit 410, LOD unit 420, and address unit 430 then perform various computations based on the texture request. In particular, TEXIN unit 410 retrieves additional information associated with the texture request (e.g., state data), LOD unit 420 computes a level of detail associated with the texture request, and address unit 430 determines an encoding format, size, dimension, and position associated with the requested texture data.

At step 520, tag unit 440 determines whether the requested texture data is resident within cache unit 462. If the requested data is not resident within cache unit 462, a cache miss occurs, and the method 500 then proceeds to step 540. At step 540, miss processing unit 450 retrieves encoded texture data from global memory. At step 550, decode unit 461 decodes the encoded texture data based on the determined format of the request data. At step 560, cache unit 462 stores different portions of the requested data in particular banks, sectors, and sets according to one or more of caching maps 470. The caching maps correspond to the dimension of the requested data. At step 570, data unit 460 then fulfills the texture request by providing the decoded texture data to SM 310.

At step 520, if tag unit 440 determines that the requested data is, in fact, resident within cache unit 462, a cache hit occurs, and the method 500 then proceeds to step 530. At step 530, data unit 460 retrieves one or more of caching maps 470 corresponding to the dimension of the requested data. Data unit 460 then reads different portions of the requested data from particular banks, sectors, and sets of cache unit 462, based on the retrieved caching maps, and then reassembles those portions into the requested texture data. At step 570, data unit 460 then fulfills the texture request by providing the decoded texture data to SM 310.

By implementing the method 500, texture processing pipeline 400 of FIG. 4 is capable of storing decoded texture data within cache unit 462, thereby increasing the throughput of that cache unit. Specifically, when a cache hit occurs, the decoded data may be provided directly from cache unit 462 without the need for decoding. Although the decoded data may have a larger size compared to equivalent encoded data, the decoded data is efficiently packed into cache unit 462 according to caching maps 470, potentially recouping some or all of the efficiency losses caused by the storage of larger data.

The caching maps discussed in conjunction with FIGS. 4-5 are also described in greater detail below in conjunction with FIGS. 6A-7B. In particular, FIGS. 6A-6B illustrate caching maps for storing a 5×5 texture that may minimize bank conflicts. FIGS. 7A-7B illustrates caching maps for storing a 6×5 texture that may minimize bank conflicts and set conflicts.

FIG. 6A illustrates an exemplary caching map 600 that indicates various banks and sectors within cache unit 462 where different portions of decoded texture data may be stored to avoid bank conflicts, according to one embodiment of the present invention. Caching map 600 may be included within caching maps 470 of FIG. 4. Caching map 600 is a 5×5 map that corresponds to a 5×5 texture. Each cell of caching map 600 corresponds to a different texel of that 5×5 texture. Caching map 600 specifies different sectors of a given cache line where corresponding texels of the 5×5 texel should be stored. Additionally, caching map 600 indicates particular banks where corresponding texels should be stored, for each such sector.

As shown, caching map 600 includes regions 601-1, 601-2, 601-3, 602-1, 602-2 603-1, 603-2, and 604-1. Each such region corresponds to a particular sector of a cache line in cache unit 462. Regions 601-1, 601-2, and 601-3 correspond to a sector 601. Regions 602-1 and 602-2 correspond to a sector 602. Regions 603-1 and 603-2 correspond to a sector 603, and region 604-1 corresponds to a sector 604. Caching map 600 indicates that each texel within a given region should be stored within the corresponding sector of a cache line in cache unit 462.

As also shown, each different region, corresponding to a given sector, includes different banks where texels should be stored. For example, region 601-1, corresponding to sector 601, indicates that each texel in a 2×2 square of texels should be stored within banks B0, B1, B2, and B3. Similarly, region 603-2, corresponding to sector 603, indicates that each texel in a 1×2 rectangle of texels should be stored within banks B0 and B2.

The organization of caching map 600 is driven by the characteristic of cache unit 462 that different banks of the same sector may be accessed in a single clock cycle, and that banks in different sectors may also be accessed in a single clock cycle. If the same bank in the same sector were addressed in a given clock cycle, an additional clock cycle would be required to provide the requested data. Caching map 600 is therefore organized so that adjacent texels are stored in different banks, as is shown. In addition, caching map 600 is organized so that adjacent regions of texels are stored in different sectors, as also shown. This particular organization of caching map 600 (and caching maps 470 in general) allows large portions of a texture to be read from cache unit 462 without creating bank conflicts and, thus, with a low number of clock cycles.

For example, when accessing the 5×5 texture associated with caching map 600, data unit 460 could read texels associated with regions 601-1, 602-1, 603-1, and 604-1 from cache unit 462 in just one clock cycle. Since these texels reside in different sectors, data unit 460 may read those texels during the same clock cycle. Additionally, since the texels within each sector reside in different banks, data unit 460 may access those banks in one clock cycle without causing a bank conflict. Further, by breaking the decoded texture data into pieces and storing those pieces at specific locations in cache unit 462, the decoded texture data may be packed into cache unit 462 with higher efficiency compared to simply caching the decoded texture data as one large block.

Caching map 600 described herein represents just one possible example of a caching map that data unit 460 may rely upon when writing or reading decoded texture data to or from cache unit 462. Data unit 460 may also rely on different 5×5 caching maps for different, adjacent textures, as described below in conjunction with FIG. 6B.

FIG. 6B illustrates exemplary caching maps 600, 610, 620, and 630 that indicate various banks and sectors within cache unit 462 where different portions of decoded texture data may be stored to avoid bank conflicts, according to one embodiment of the present invention. As shown, caching map 600 indicates the same sectors 601, 602, 603, and 604 described above in conjunction with FIG. 6A. The banks B0, B1, B2, and B3 also discussed above have been omitted for the sake of simplicity. Caching maps 610, 620, and 630 also indicate sectors 601, 602, 603, and 604, although each of the different caching maps shown in FIG. 6B have a different organization of sectors.

Data unit 460 is configured to store adjacent decoded textures according to adjacent caching maps shown in FIG. 6B. With this approach, when data unit 460 accesses multiple different textures within cache unit 462, those data accesses are distributed across different sectors when progressing from one texture to a subsequent texture, thereby improving the throughput of cache unit 462. Data unit 460 may rely on caching maps arranged in the fashion shown in FIG. 6B when writing data to cache unit 462 or reading data from that unit.

In addition to caching maps that reduce bank conflicts, data unit 460 may also rely on caching maps that reduce set conflicts, as described in greater detail below in conjunction with FIGS. 7A-7B.

FIG. 7A illustrates exemplary caching maps 700 that indicate various sectors and sets within cache unit 462 where different portions of decoded texture data may be stored to avoid set conflicts, according to one embodiment of the present invention. As shown, caching maps 700 include multiple different caching maps tiled together in similar fashion as shown in FIG. 6B. Each caching map within caching maps 700 is a 6×5 caching map that specifies different sectors 701, 702, 703, and 704 where corresponding texels are to be stored. The particular banks where those texels should be stored have been omitted for clarity. Horizontal and vertical boundaries between caching maps are denoted by arrows at the border of caching maps 700.

As also shown, various groups of sectors have been grouped together within caching maps 700 according to the particular set within which those sectors reside. Caching maps 700 include groups 710-1, 710-2, 710-3, 711-1, 711-2, 711-3, 712-1, and 713-1. Groups 710-1, 710-2, and 710-3 correspond to set 710, groups 711-1, 711-2, and 711-3 correspond to set 711, and groups 712-1 and 713-1 correspond to sets 712 and 713, respectively.

The organization of caching maps 700 is driven by the characteristic of cache unit 462 that different cache lines (and corresponding sectors) within different sets may be accessed in a single clock cycle. If two cache lines from the same set were addressed in a single clock cycle, an additional clock cycle would be required to provide the requested data. Caching maps 700 are therefore organized so that adjacent groups of sectors are stored in cache lines in different sets, as is shown. This particular organization of caching maps 700 (and caching maps 470 in general) allows many contiguous textures to be read from cache unit 462 without creating set conflicts and, thus, with a low number of clock cycles.

For example, when accessing multiple adjacent 6×5 textures associated with caching maps 700, data unit 460 could read texels associated with groups 710-1, 711-1, and 712-2 from cache unit 462 in just one clock cycle. Since these texels reside in different sets, data unit 460 may access those sets in one clock cycle without causing a set conflict.

Caching maps 700 described herein represent just one possible example of a tiling of caching maps that data unit 460 may rely upon when writing or reading decoded texture data to or from cache unit 462. Data unit 460 may also rely on much larger tilings of caching maps for different, adjacent textures, as described below in conjunction with FIG. 7B.

FIG. 7B illustrates exemplary caching maps 750 that indicate various sets within cache unit 462 where different portions of decoded texture data may be stored to avoid set conflicts, according to one embodiment of the present invention. As shown, caching maps 750 include multiple different caching maps tiled together. Each caching map within caching maps 750 is a 6×5 caching map that specifies different sets 710, 711, 712, and 713 where corresponding texels are to be stored. The particular sectors and banks where those texels should be stored have been omitted for clarity. Horizontal and vertical boundaries between caching maps are denoted by arrows at the border of caching maps 700.

Like caching map 700 discussed above in conjunction with FIG. 7A, the organization of caching maps 750 is driven by the characteristic of cache unit 462 that different cache lines (and corresponding sectors) within different sets may be accessed in a single clock cycle. Caching maps 750 are therefore organized so that adjacent groups of sectors are stored in cache lines in different sets, as is shown.

Persons skilled in the art will understand that the exemplary caching maps described above in conjunction with FIGS. 6A-7B are provided for exemplary purposes only. Those caching maps illustrate that decoded texture data may be efficiently packed into cache unit 462 with a particular approach that minimizes the occurrence of bank conflicts and set conflicts. In addition, persons skilled in the art will recognize that the exemplary caching maps described in FIGS. 6A-7B represent only a subset of the possible caching maps that data unit 460 may rely upon for writing data to and reading data from cache unit 462 within the scope and context of the present invention.

In sum, a texture processing pipeline is configured to store decoded texture data within a cache unit in order to expedite the processing of texture requests. When a texture request is processed, the texture processing pipeline queries the cache unit to determine whether the requested data is resident in the cache. If the data is not resident in the cache unit, a cache miss occurs. The texture processing pipeline then reads encoded texture data from global memory, decodes that data, and writes different portions of the decoded memory into the cache unit at specific locations according to a caching map. If the data is, in fact, resident in the cache unit, a cache hit occurs, and the texture processing pipeline then reads decoded portions of the requested texture data from the cache unit and combines those portions according to the caching map.

Advantageously, the texture processing pipeline may include a limited number of decoder units while retaining the ability to cache texture data efficiently. By caching texture data based on caching maps, the texture processing pipeline may pack texture data into the cache unit without wasting significant space. Additionally, the texture processing pipeline may store texture data within the cache unit in such a way that bank conflicts and/or set conflicts may be reduced or avoided, thereby increasing throughput of the cache unit.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for caching data being processed in a texture processing pipeline, the method comprising:
    receiving a memory access request indicating that a data block should be returned from memory;
    determining that the data block does not reside in a cache unit associated with the texture processing pipeline, wherein the cache unit comprises a plurality of sectors, each sector comprising a plurality of banks;
    retrieving an encoded version of the data block from a global memory;
    decoding the encoded version of the data block to produce the data block comprising a height dimension and a width dimension in texels, wherein a data block comprises a texture comprising a plurality of regions, each region comprising a plurality of texels;
    retrieving a first caching map from a plurality of caching maps based on the height and width dimensions of the data block, wherein the first caching map specifies that adjacent regions of the data block are stored in different sectors of the cache unit and adjacent texels of the data block are stored in different banks of the cache unit; and
    storing a first texel of the data block at a particular location within the cache unit according to the first caching map.

2. The computer-implemented method of claim 1, wherein storing the first texel of the data block comprises:
    identifying a first cache line within the cache unit that is available to store the first texel of the data block;
    identifying a first cell included in the first caching map that corresponds to the first texel of the data block, wherein the first caching map includes a different cell for each portion of the data block;
    determining a sector within the first cache line based on the first cell;
    determining a bank associated with the sector based on the first cell; and
    storing the first texel of data within the bank.

3. The computer-implemented method of claim 2, wherein identifying the first cache line within the cache unit comprises;
    determining a set of cache lines within which the first texel of the data block should be stored according to the first caching map, wherein the first cache line is included in the set of cache lines; and
    identifying the first cache line as being available to store the first texel of the data block.

4. The computer-implemented method of claim 1, further comprising transmitting the data block to a processing engine to fulfill the memory access request.

5. The computer-implemented method of claim 1, further comprising:
    receiving another memory access request indicating that the data block should be returned from memory;
    determining that the data block resides in the cache unit;
    retrieving each portion of the data block from a different location within the cache unit according to the first caching map; and
    combining the portions of the data block to reconstruct the data block.

6. The computer-implemented method of claim 5, further comprising transmitting the data block to a processing engine to fulfill the memory access request.

7. The computer-implemented method of claim 1, wherein the data block is encoded according to an advanced scalable texture compression (ASTC) encoding standard to produce the encoded version of the data block.

8. The computer-implemented method of claim 1, wherein the data block comprises a plurality of different portions, and the first caching map specifies, for each of the different portions, a location where the different portion is to be stored within the cache unit.

9. The computer-implemented method of claim 1, wherein each caching map in the plurality of caching maps corresponds to a particular set of data block dimensions.

10. A subsystem configured to cache data being processed in a texture processing pipeline, including:
    the processing pipeline, configured to:
        receive a memory access request indicating that a data block should be returned from memory;
        determine that the data block does not reside in a cache unit associated with the texture processing pipeline, wherein the cache unit comprises a plurality of sectors, each sector comprising a plurality of banks;
        retrieve an encoded version of the data block from a global memory;
        decode the encoded version of the data block to produce the data block comprising a height dimension and a width dimension in texels, wherein a data block comprises a texture comprising a plurality of regions, each region comprising a plurality of texels;
        retrieve a first caching map from a plurality of caching maps based on the height and width dimensions of the data block, wherein the first caching map specifies that adjacent regions of the data block are stored in different sectors of the cache unit and adjacent texels of the data block are stored in different banks of the cache unit; and store a first texel of the data block at a particular location within the cache unit according to the first caching map.

11. The subsystem of claim 10, wherein the processing pipeline is configured to store the first texel of the data block by:
identifying a first cache line within the cache unit that is available to store the first texel of the data block;
identifying a first cell included in the first caching map that corresponds to the first texel of the data block, wherein the first caching map includes a different cell for each portion of the data block;
determining a sector within the first cache line based on the first cell;
determining a bank associated with the sector based on the first cell; and
storing the first texel of data within the bank.

12. The subsystem of claim 11, wherein the processing pipeline is configured to identify the first cache line within the cache unit by:
determining a set of cache lines within which the first texel of the data block should be stored according to the first caching map, wherein the first cache line is included in the set of cache lines; and
identifying the first cache line as being available to store the first texel of the data block.

13. The subsystem of claim 10, wherein the processing pipeline is further configured to transmit the data block to a processing engine to fulfill the memory access request.

14. The subsystem of claim 10, wherein the processing pipeline is further configured to:
receive another memory access request indicating that the data block should be returned from memory;
determine that the data block resides in the cache unit;
retrieve each portion of the data block from a different location within the cache unit according to the first caching map; and
combine the portions of the data block to reconstruct the data block.

15. The subsystem of claim 14, wherein the processing pipeline is further configured to transmit the data block to a processing engine to fulfill the memory access request.

16. The subsystem of claim 10, wherein the data block is encoded according to an advanced scalable texture compression (ASTC) encoding standard to produce the encoded version of the data block.

17. The subsystem of claim 10, wherein the width dimension comprises a first number of texels and the height dimension comprises a second number of texels.

18. The subsystem of claim 10, wherein the processing pipeline is configured to retrieve the first caching map from a memory that stores a plurality of caching maps, and each caching map included in the plurality of caching maps is associated with a different set of data block dimensions.

19. A computing device configured to cache data being processed in a processing pipeline, including:
the processing pipeline, configured to:
receive a memory access request indicating that a data block should be returned from memory;
determine that the data block does not reside in a cache unit associated with the texture processing pipeline, wherein the cache unit comprises a plurality of sectors, each sector comprising a plurality of banks;
retrieve an encoded version of the data block from a global memory;
decode the encoded version of the data block to produce the data block comprising a height dimension and a width dimension in texels, wherein a data block comprises a texture comprising a plurality of regions, each region comprising a plurality of texels;
retrieve a first caching map from a plurality of caching maps based on the height and width dimensions of the data block, wherein the first caching map specifies that adjacent regions of the data block are stored in different sectors of the cache unit and adjacent texels of the data block are stored in different banks of the cache unit; and
store a first texel of the data block at a particular location within the cache unit according to the first caching map.

20. The computing device of claim 19, wherein the processing pipeline is configured to store the first texel of the data block by:
identifying a first cache line within the cache unit that is available to store the first texel of the data block;
identifying a first cell included in the first caching map that corresponds to the first texel of the data block, wherein the first caching map includes a different cell for each portion of the data block;
determining a sector within the first cache line based on the first cell;
determining a bank associated with the sector based on the first cell; and
storing the first texel of data within the bank.

21. The computing device of claim 20, wherein the processing pipeline is configured to identify the first cache line within the cache unit by:
determining a set of cache lines within which the first texel of the data block should be stored according to the first caching map, wherein the first cache line is included in the set of cache lines; and
identifying the first cache line as being available to store the first texel of the data block.

22. The computing device of claim 19, wherein the processing pipeline is further configured to transmit the data block to a processing engine to fulfill the memory access request.

* * * * *